United States Patent
Constantinou et al.

(10) Patent No.: US 6,754,136 B2
(45) Date of Patent: Jun. 22, 2004

(54) HYDROPHONE WITH AUTOMATIC INHIBITION IN CASE AN ADJUSTABLE IMMERSION THRESHOLD IS EXCEEDED

(75) Inventors: Georges Constantinou, La Varenne Saint Hilaire (FR); Axelle Baroni, Rueil Malmaison (FR); Patrick Meynier, Chatou (FR)

(73) Assignees: Institut Francais du Petrole, Rueil-Malmaison Cedex (FR); Vinci Technologies, Rueil-Malmaison Cedex (FR)

( * ) Notice: Subject to any disclaimer, the term of this patent is extended or adjusted under 35 U.S.C. 154(b) by 0 days.

(21) Appl. No.: 10/281,157

(22) Filed: Oct. 28, 2002

(65) Prior Publication Data

US 2003/0086337 A1 May 8, 2003

(30) Foreign Application Priority Data

Nov. 2, 2001 (FR) .............................. 01 14249
Jun. 21, 2002 (FR) .............................. 02 07694

(51) Int. Cl.$^7$ ............................................ H04R 1/44
(52) U.S. Cl. ...................................... 367/172; 367/167
(58) Field of Search ................................ 367/167, 172, 367/174; 310/337

(56) References Cited

U.S. PATENT DOCUMENTS

| 3,970,878 A | 7/1976 | Berglund |
| 3,993,973 A | * 11/1976 | Hutchins et al. ............ 367/172 |
| 4,074,224 A | * 2/1978 | Laurent ....................... 367/167 |
| 4,336,639 A | 6/1982 | Berglund |
| 4,926,397 A | 5/1990 | Robertson |
| 5,136,549 A | 8/1992 | Berglund |

FOREIGN PATENT DOCUMENTS

| FR | 1556971 | 2/1969 |
| FR | 2122675 | 9/1972 |
| FR | 2733831 | 11/1996 |
| FR | 2748183 | 10/1997 |
| FR | 2792802 | 10/2000 |

* cited by examiner

*Primary Examiner*—Ian J. Lobo
(74) *Attorney, Agent, or Firm*—Antonelli, Terry, Stout & Kraus, LLP

(57) ABSTRACT

A hydrophone which is automatically inhibited when the immersion depth exceeds a predetermined threshold by action, on the push element (7) of a switch (6), of a flexible wall that bends under the action of the outside pressure. The hydrophone comprises a tubular body (1) with two chambers (1*a*, 1*b*) separated by a partition (2). One of the chambers is closed by a flexible diaphragm (4). Switch (6) is fixed at the center of one of the chambers. Diaphragm (4) can push down on and actuate push element (7) by bending. The body can advantageously consist of two parts that can be screwed onto one another, which allows easier adjustment of the inhibition pressure. A pressure-sensitive reception unit (S) is arranged in the other chamber.

37 Claims, 3 Drawing Sheets

HYDROPHONE WITH AUTOMATIC INHIBITION IN CASE AN ADJUSTABLE IMMERSION THRESHOLD IS EXCEEDED

BACKGROUND OF THE INVENTION

1. Field of the Invention

The present invention relates to a hydrophone with automatic inhibition when the immersion depth exceeds a certain adjustable threshold.

2. Description of the Prior Art

It is well-known to form hydrophones by assembling elements sensitive to pressure variations, such as discs made of a piezoelectric material, associated each with a pair of electrodes arranged on either side. Each disc is stuck onto a flexible support such as a diaphragm, one of the faces thereof being exposed to the pressure variations to be measured.

The flexible support has for example the shape of a cup which can be supported by a rigid housing or which can rest against an identical cup, itself carrying one or more sensitive elements, the two cups being in contact with one another at one edge and delimiting a housing. The electrodes of the two sensitive elements are preferably electrically interconnected so as to provide compensation for the parasitic effects due to accelerations.

When the outside static pressure increases, the two plates bend until they rest against each other. The space between them is so selected that their maximum deformation, when they are pressed against each other, remains within elastic deformation limits. The detector is thus protected against accidental overpressures. The housing thus formed can be coated with a layer made of a material transparent to acoustic waves.

The sensitive elements can be externally fastened to the housing so that their sensitivity does not vary much with the hydrostatic pressure variations (less than 10% for a 10 Map static pressure for example). The sensitive elements are generally covered with a protecting coating (such as a varnished araldite layer) so as to maintain a sufficient electric insulation in relation to the outside environment. This layout allows obtaining of very sensitive detectors at a relatively low cost.

According to another well-known layout, the sensitive elements are fastened to the inner faces of the cups and therefore inside the housing, which provides good protection against the outside environment. A stop can be arranged between the two cups so as to limit deformation of the diaphragms towards the inside and to short-circuit the electrodes of the two sensitive elements facing each other.

It is also well known to position the housings containing one or two sensitive elements inside a rigid tube by means of a hollowed flat centering element made of a deformable material, and to run an acoustically transparent sealed sheath therein. In subsea seismic listening applications or for seismic prospecting, these tubes are distributed in large numbers inside a supple sheath of often very great length, or streamer, filled with kerosine or mineral oil, which is towed by a boat Various piezoelectric detectors are described for example in French patents 1,556,971, 2,122,675, 2,748,183 or 2,792, 802 or U.S. Pat. No. 5,889,731, all filed in the name of one of the applicants or of both, or in U.S. Pat. Nos. 3,970,878, 4,336,639, 4,926,397 or 5,136,549.

Piezoelectric hydrophones, such as those mentioned above, are designed to work within a certain depth range.

The sensitivity of the piezoelectric elements decreases with the flexion of the diaphragms. Beyond a certain flexion, their response to the pressure variations to be measured stops being reliable, and it can even become zero in case of a short-circuit of the electrodes facing each other (detectors with sensitive elements against the inner faces of the cups).

SUMMARY OF THE INVENTION

The automatic-inhibition hydrophone according to the invention is suited for use in a well-defined and adjustable depth range and is automatically inhibited when a predetermined depth threshold is exceeded. The hydrophone of the invention comprises at least one detection unit producing an electric signal on electric wires in response to the pressure variations applied.

The hydrophone of the invention comprises at least one flexible diaphragm that bends under the action of the pressure exerted externally on the hydrophone and a switch arranged opposite so as to be actuated by the diaphragm for a predetermined outside pressure, at least one of the electrical wires of the detection unit being connected to the switch so that the release of the switch inhibits the response of the sensitive element.

According to a first embodiment, the hydrophone comprises a tubular body comprising a fist chamber closed by a flexible diaphragm which bends under the action of the pressure exerted externally on the hydrophone, and a second chamber open onto the outside environment and communicating with the first chamber by a channel. The switch has a push element which is arranged opposite the flexible diaphragm closing the first chamber so as to be actuated thereby for a predetermined outside pressure, the detection unit is arranged in the second chamber, so that at least one of the electrical wires is connected to the switch in the first chamber, so that release of the switch by action of the flexible diaphragm inhibits the response of the sensitive element.

The hydrophone comprises for example a block made of an acoustically transparent material in which the detection clement of the second chamber is embedded.

According to a first variant, the second chamber is separated from the first chamber by an inner partition including at least one channel allowing passage of at least one electrical wire connecting the switch to the detection unit, and the inner wall of the body on the first chamber side is, for example, designed to limit deformation of the diaphragm towards the inside of the first chamber.

According to another variant, the second chamber is separated from the first chamber by an inserted rigid plate made of a dielectric material which is fastened to the inside of the body, this plate carrying the switch and being suited to bring it into electrical contact with at least one electrical wire connecting the switch to the detection unit.

This rigid plate is, for example, an insulating plate provided with conducting tracks allowing connection of the terminals of the switch to the electric wires of the detection unit.

The hydrophone comprises, for example, a ring made of a plastic or metallic material, arranged in the first chamber between the diaphragm and the rigid plate, which is suited to limit deformation of the diaphragm towards the inside of the first chamber.

According to a first embodiment example, the detection element in the second chamber comprises a housing of two cups resting against each other, at least one of the cups being provided with a flexible central part or diaphragm, and at least one sensitive element associated with electrodes, which is fastened to the central part of at least one of the cups, electric conductors connected to the electrodes of each sensitive element, and a protective sheath for protection of the detection unit, the switch being connected to at least one electrical conductor.

According to a second embodiment example, the detection element in the second chamber comprises a housing of two cups resting against each other, at least one of the cups being provided with a flexible central part or diaphragm, and at least one sensitive element associated with electrodes, which is fastened to the central part of at least one of the cups, electrical conductors connected to the electrodes of each sensitive element, and a protective sheath for protection of the detection unit, the switch connected to at least one electric conductor being arranged inside the housing so as to be released by at least one diaphragm of the housing bending under the action of the hydrostatic pressure.

According to another example, the detection element comprises an intermediate support arranged between the two cups, the switch being fastened to this intermediate support with a push element thereof facing the central part of one of the cups, and a sealed insulating bushing for passage, towards the outside of the housing, of an electric conductor connected to the switch.

According to another embodiment example, the switch is of the type provided with flexible blades suited to remain in electric contact with one another as long as the flexion of at least one of the diaphragms remains below a fixed threshold.

According to another embodiment, the tubular body of the hydrop hone comprises a fixed part containing the detection unit and the switch, and a moving part closed at a first end by the diaphragm, tightly screwed onto the fixed part, so that the effective space remaining between the diaphragm and the push element allows the switch to be always released at a well-defined pressure.

The hydrophone is therefore preferably mounted in such a way that the moving part of the body is first fitted onto the fixed part by screwing, a predetermined nominal pressure applied to the diaphragm causing bending thereof towards the inside of the body, then fitting of the two parts onto each other by continued screwing until the switch is actuated by the bent diaphragm.

As the case may be, the switch is normally open or normally closed.

The hydrophone, as defined above, is light and compact. Its outer surface is practically free of rough patches likely to disturb fluid flows around the outer surface. The diaphragm provides perfect sealing and insulates the switch electrically. Furthermore, the embodiment and the mounting mode wherein the body is made of two parts that fit into one another allows obtaining a good reproducibility of the hydrophone triggering conditions.

BRIEF DESCRIPTION OF THE DRAWINGS

Other features and advantages of the hydrophone according to the invention will be clear from reading the description hereafter of non limitative examples, with reference to the accompanying drawings wherein.

DETAILED DESCRIPTION OF THE PREFERRED EMBODIMENTS

Figure 1:
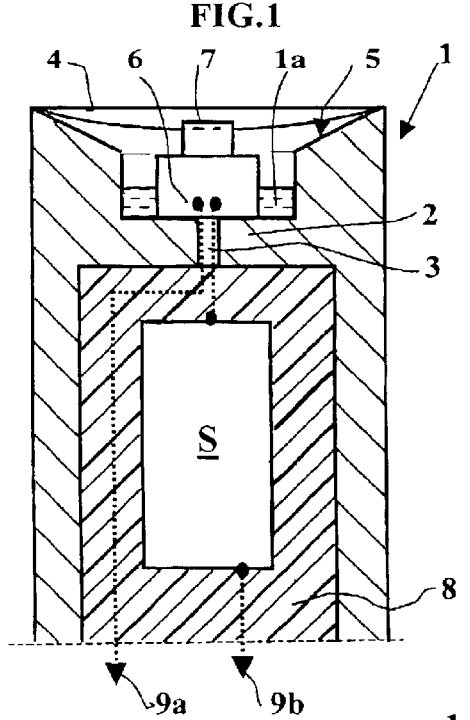
FIG. 1 diagrammatically shows a first embodiment of the hydrophone with its switch allowing controlled inhibition when a fixed depth value is exceeded, FIG. 2 diagrammatically shows an embodiment of the detection element of the hydrophone, FIG. 3 diagrammatically shows a protective sheath for the detection element, FIG. 4 diagrammatically shows the detection element of FIG. 3 in its tubular housing, FIG. 5 diagrammatically shows a second embodiment of the detection element with an internal switch, FIG. 6 diagrammatically shows a third embodiment of the detection element with an internal switch provided with flexible blades, FIGS. 7 and 8 diagrammatically show two embodiment variants of the hydrophone of FIG. 1 comprising inserted elements inside the body of the hydrophone and two different switches, FIG. 9 diagrammatically shows an improved embodiment allowing obtaining of precise adjustment of the hydrophone triggering threshold, and FIG. 10 diagrammatically shows a hydrophone mounting tool allowing obtaining of fine adjustment of the hydrophone triggering threshold.

The hydrophone comprises (FIGS. 1 and 4) a tubular body 1 open at both ends. A partition 2 divides the inside of body 1 into two unequal chambers 1a and 1b which communicate with one another through a relatively narrow channel 3. The end of body 1, on the small chamber 1a side, is closed by a diaphragm 4 made for example from a Cu/Be alloy. The terminal part of body 1 is bevelled towards the inside. The small bowl 5 defined by this bevel allows diaphragm 4 to bend towards the inside of body 1. A switch 6 provided with a push element 7, on which diaphragm 4 can push and actuate by bending, is fastened (by adhesion for example) to the center of small chamber 1a. Switch 6 can be normally open or normally closed, as the case may be.

A pressure-sensitive reception unit S is arranged in the larger chamber 1b. The unit S is embedded in a block made of an acoustically transparent plastic material 8 which insulates it from the outside environment. The signal produced by reception unit S in response to the pressure variations of the outside environment is available on electrical conductors 9a and 9b. Switch 6 is interposed on at least one of the conductors so that its release inhibits the signal of reception unit S. If switch 6 is normally closed, for example (FIG. 1), it is interposed on one of the wires 9a so that its release opens the circuit.

The flexibility of diaphragm 4 and the position of push element 7 are so selected that switch 6 is actuated and the hydrophone is cut off for a predetermined hydrostatic pressure, 3 MPa for example. It has been observed that the hydrostatic triggering pressure remains particularly stable and practically insensitive to aging. Reception unit S can be of any type, with for example having a sensitive element of a tube or a hollow sphere made of a piezoelectric ceramic associated with electrodes. The pressure variations are transmitted thereto creating mechanical stresses that the sensitive element translates into an electric signal.

In the embodiment described hereafter by way of example, the flexion of the diaphragms is used to generate stresses in one or more piezoelectric ceramic discs.

Each reception unit S comprises (FIG. 2) a housing 10 having two identical cups 10a and 10b arranged symmetrically, resting against each other on the periphery thereof, provided for example with a resting edge or rim 11. The cups can be machined or drawn. A sensitive element 12, such as a piezoelectric ceramic disc for example associated with two electrodes 12a and 12b, adheres to the face of the flexible central part of each cup 10a and 10b. Electrode 12b of each sensitive element is for example a conducting film interposed between sensitive disc 5 and the resting face of cup 10a and 10b, or possibly this face itself, if electrode 12b is electrically conducting. Preferably, according to a conventional connection mode, electrodes 12a and 12b of the two sensitive elements 12 are respectively interconnected. When housing 10 is electrically conducting (as it is the case in the embodiment described), it is this housing which provides interconnection of electrodes 12b in contact with cups 10a and 10b. The opposite electrodes 12a are interconnected by connection of associated conductors 13a A conducting wire 13b is electrically connected to housing 10. The voltage generated by the sensitive elements in response to the pressures applied outside the housing is available between wires 13a and 13b. Housing 10 is inserted in protective sheath 14 made of an insulating plastic material.

Reception unit 1 in its sheath 14 is in a median plane of the larger chamber 1b (FIG. 4) and embedded in a block of controlled thickness.

Figure 2:
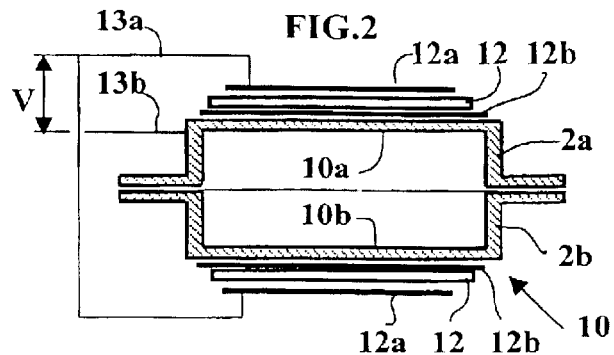
Figure 3:
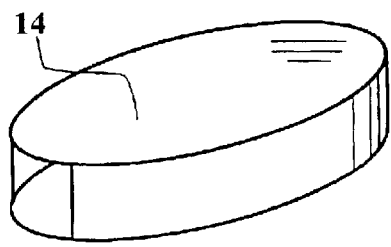
Figure 5:
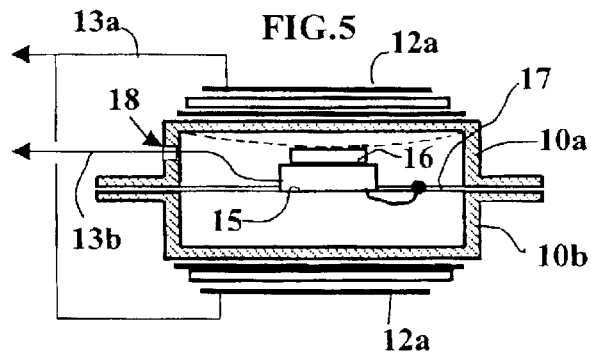

According to the embodiment of FIG. 5, the hydrophone comprises a reception unit 1 as shown in FIG. 2, directly associated with a switch 15 arranged inside housing 2. The switch is fastened to an intermediate support 17 arranged between cups 10a and 10b. The switch is normally closed and its terminals are interposed on electric conductor 13b connected to the housing. This conductor 13b runs through the wall of housing 10 by means of an insulating sealed bushing 18 (glass bead for example). The voltage V delivered by the hydrophone is available between interconnected conducting wires 13a and common wire 13b. Again, in this case, the height of cups 10a and 10b and their flexibility are selected according to the dimensions of switch 15 so that push element 16 is actuated for a well-defined boundary hydrostatic pressure, and the hydrophone is disconnected.

Figure 6:
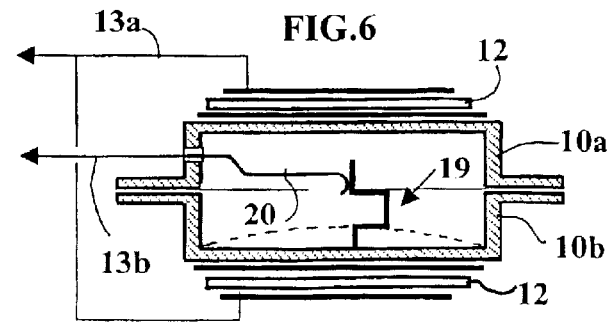

According to the embodiment of FIG. 6, switch 6 is of the type provided with flexible blades with a first blade 19 electrically connected to one of the cups 10a and a second blade 20 electrically insulated from housing 10 by a glass bead 16. Blades 19 and 20 are designed to remain in contact with one another as long as the flexion of at least one of the diaphragms under the action of the outside pressure remains within fixed limits. The absence of contact brings, for example, one of the terminals of the hydrophone into the air.

Figure 4:
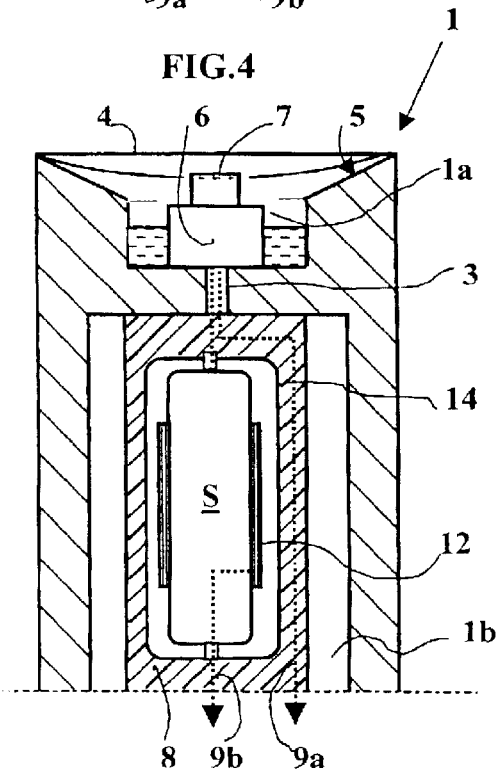
Figure 7:
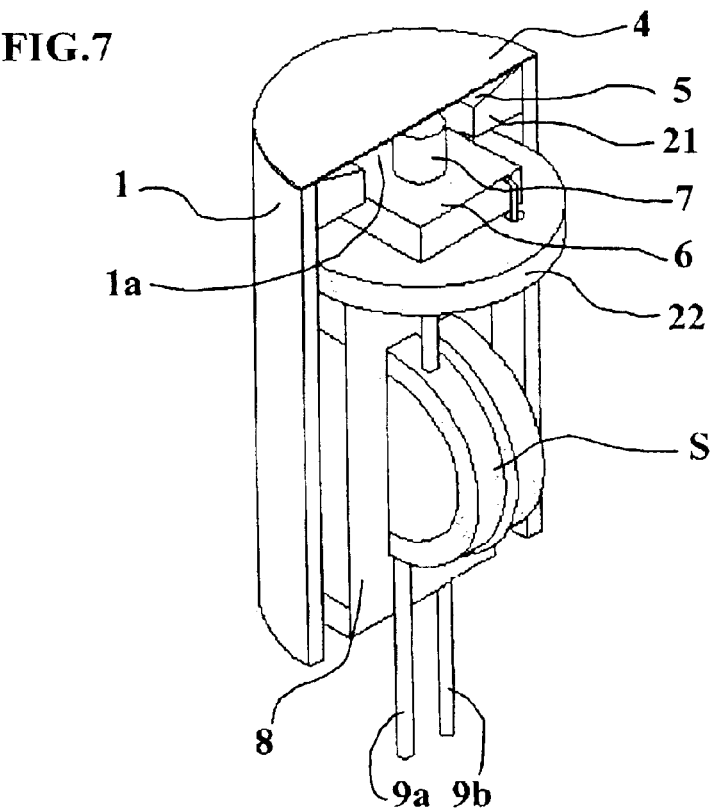
Figure 8:
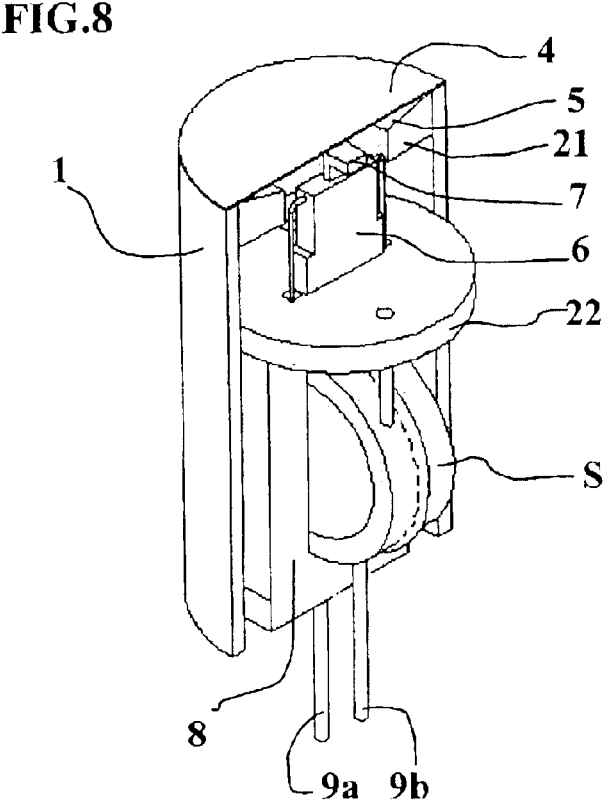

In the embodiment of the hydrophone shown in FIGS. 7 and 8, the elements corresponding to those of FIGS. 1 and 4 have the same reference numbers. The hydrophone also comprises a tubular body 1 with one end closed by a diaphragm 4 made of for example a Cu/Be alloy. A ring 21 made of a plastic material such as nylon and bevelled towards the inside is pressed against diaphragm 4. The small bowl 5 defined by this bevel allows flexion of diaphragm 4 towards the inside of body 1. The partition, which separates chambers 1a and 1b, is an inserted rigid plate 22 made of a non-conducting material. Switch 6 is provided with a push element 7 fastened to one of the faces, on the small chamber 1a side. By means of conducting tracks running through plate 22, the terminals of switch 6 are electrically connected to electrical conductors 9a and 9b associated with transducer S.

Mounting of the hydrophone is thus simplified. Ring 21 is first fitted into body 1 at the open end thereof until it is in contact with the diaphragm and it is fastened to the inner wall of the body, by adhesion for example. Rigid plate 22 is then engaged until the push element is in contact with the diaphragm and the push element is similarly fastened by adhesion so as to tightly separate the two chambers. Transducer S, which is electrically connected to at least one of the conducting wires connected through rigid plate 22 to the terminals of switch 6, is then placed in the body and is insulated from the outside environment by filling large cavity 1b with an acoustically transparent material 8.

Similarly, switch 6 can be normally open or normally closed.

Figure 9:
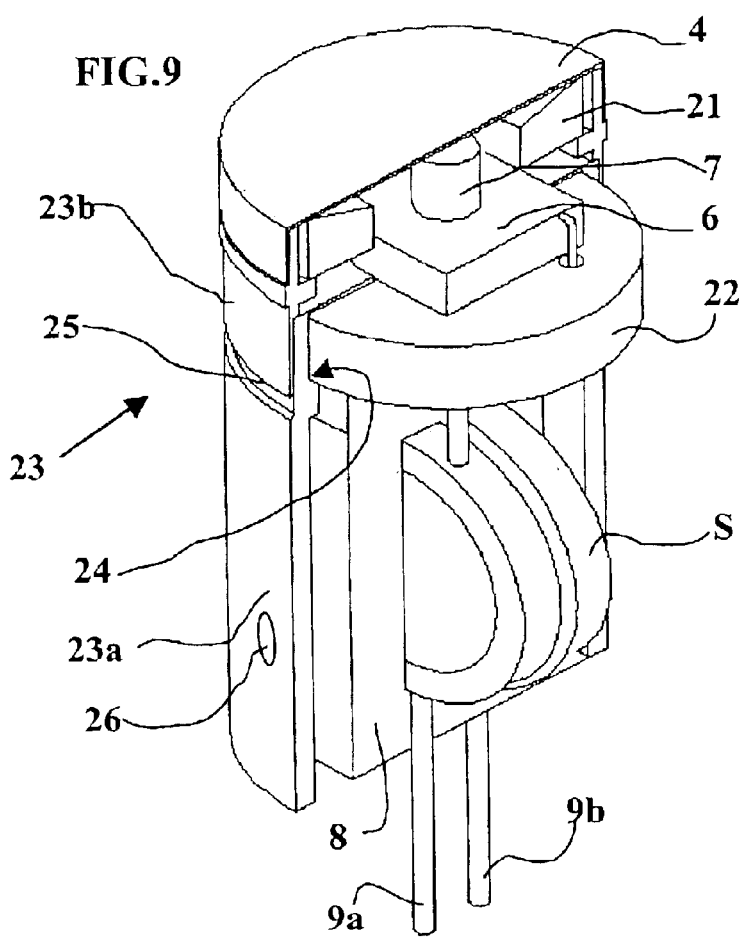

According to the embodiment of FIG. 9, which is a variant of the previous embodiment of FIG. 7, body 23 of the hydrophone comprises a part 23a containing reception unit S and associated elements 6, 7 and 22, and a complementary part 23b forming a cover which can be assembled by screwing onto part 23a. The inner wall of part 23a comprises a shoulder 24 against which rigid plate 22 rests and an external thread 25. Cover 23b also comprises an inner shoulder on which the bevelled ring forming a stop 21 rests and an external thread suited to the external thread 25 of part 23a of the body. Diaphragm 4 is welded (laser welding for example) onto the terminal face of cover 23b. Orifices 26 are provided, preferably through the wall of the body, allowing discharge of the air that may have been trapped during mounting of the hydrophone.

During the mounting operation, rigid plate 22 associated with reception unit S is fitted into part 23a of the body until it rests against shoulder 24 and it is held in position by drawing. Cover 23b is then screwed onto part 23a so as to insulate chamber 1a from the outside environment. Driving in of the cover by screwing is so adjusted that the hydrophone is inhibited for a predetermined pressure.

Figure 10:
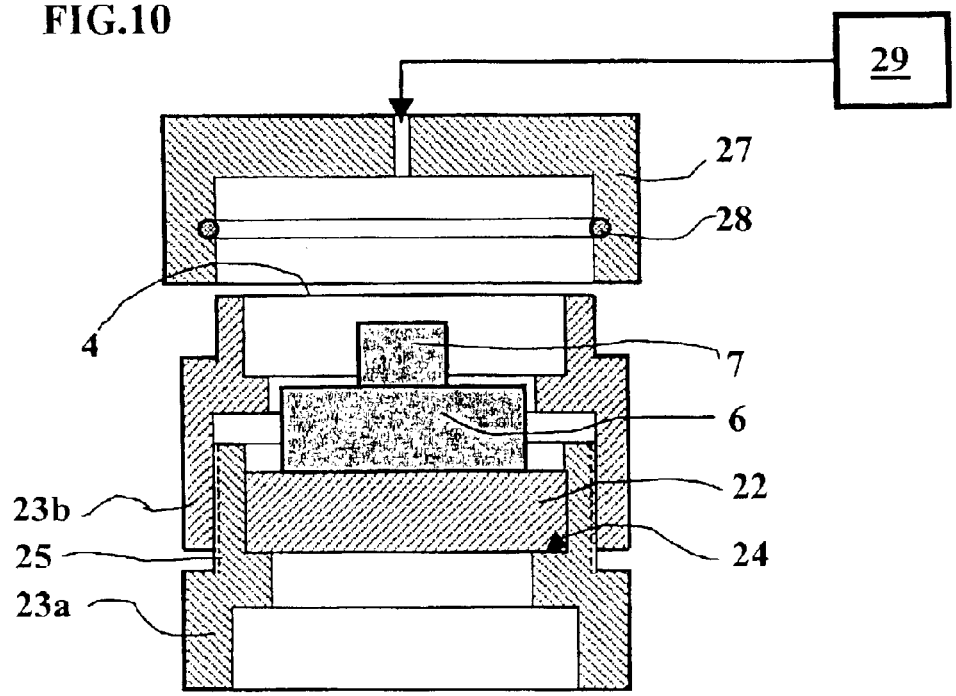

A tubular part 27 (FIG. 10), whose inner section is suited to the outer section of cover 23a and internally provided with a seal 28, is therefore used. A channel allowing communication with a source delivering a fluid under an adjustable pressure, adjusted to the desired hydrophone inhibition pressure, is connected to part 27. Tubular part 27 allows cover 23b of the body to be tightly covered and the predetermined pressure is applied, which causes the diaphragm to bend towards the inside of the housing. By means of a tool, cover 23b is then screwed onto part 23a of the body until the bent diaphragm is pressed against push element 7 and releases switch 6.

This adjustment of each hydrophone is particularly simple, fast and convenient because it is suited to the mechanical elements used which cooperate to produce the release. It accounts for the effective flexibility of diaphragm 4, of the effective dimensions of switch 6, of the effective travel of push element 7, considering the manufacturing tolerances of these elements, and obtains release at a constant nominal pressure.

For applications to marine seismic prospecting, hydrophones such as those described above can for example be distributed at a distance from one another along a streamer suited to be towed immersed behind a towboat.

What is claimed is:

1. A hydrophone with automatic inhibition of sensing of pressure variations when a fixed outside depth threshold is exceeded, comprising:

at least one detection unit producing an electrical signal on electrical wires in response to applied pressure variations the at least one detection unit being enclosed in a body provided with at least one flexible wall flexing under an action of pressure exerted externally on the hydrophone, a switch which is actuated by the at least one flexible wall acting on the switch when a fixed predetermined outside pressure is reached and at least one of the electrical wires of the at least one detection unit are connected to the switch and wherein activation of the switch inhibits an output of the electrical signal from the at least one detection unit.

2. A hydrophone in accordance with claim 1, comprising:
a tubular body comprising a first chamber closed by a flexible diaphragm flexing under action of pressure exerted externally on the hydrophone, the flexible diaphragm forming the flexible wall, and a second chamber open to an outside environment and insulated from the first chamber, the switch being provided with a push element in the first chamber opposite the flexible diaphragm so as to be actuated by the flexible diaphragm for a predetermined outside pressure, the at least one detection unit being in a second chamber, at least one electrical wire being connected to the switch in first chamber so that release of the switch through flexing of the flexible wall inhibits response of the at least one detection unit.

3. A hydrophone in accordance with claim 2, comprising:
a block made of an acoustically transparent material in which detection unit of second chamber is embedded.

4. A hydrophone in accordance with claim 2, wherein:
the second chamber is separated from the first chamber by an inner wall including at least one channel allowing passage of at least one electrical wire connecting the switch to the at least one detection unit.

5. A hydrophone in accordance with claim 3, wherein:
the second chamber is separated from the first chamber by an inner partition including at least one channel allowing passage of at least one electrical wire connecting the switch to the at least one detection unit.

6. A hydrophone in accordance with claim 4, wherein:
the inner wall of the body on a side of the first chamber limits deformation of the diaphragm towards an inside of first chamber.

7. A hydrophone in accordance with claim 5, wherein:
the inner wall of the body on a side of the first chamber limits deformation of the diaphragm towards an inside of first chamber.

8. A hydrophone in accordance with claim 2, wherein:
the second chamber is separated from the first chamber by a dielectric rigid plate which is fastened to a inside of the body, the plate carrying the switch and bringing the switch into electrical contact with at least one electrical wire connecting the switch to the at least one detection unit.

9. A hydrophone in accordance with claim 3, wherein:
the second chamber is separated from the first chamber by a dielectric rigid plate which is fastened to a inside of the body, the plate carrying the switch and bringing the switch into electrical contact with at least one electrical wire connecting the switch to the at least one detection unit.

10. A hydrophone in accordance with claim 8, wherein:
the plate is an insulating plate provided with conducting tracks which electrically connect terminals of the switch to electrical wires of the at least one detection unit.

11. A hydrophone in accordance with claim 9, wherein:
the plate is an insulating plate provided with conducting tracks which electrically connect terminals of the switch to electrical wires of the at least one detection unit.

12. A hydrophone in accordance with claim 8, comprising:
a ring, made of one of a metal or a plastic material, disposed in first chamber between the at least one flexible wall and the rigid plate which limits deformation of the at least one flexible wall towards an inside of first chamber.

13. A hydrophone in accordance with claim 9, comprising:
a ring, made of one of a metal or a plastic material, disposed in first chamber between the at least one flexible wall and rigid plate which limits deformation of the at least one flexible wall towards an inside of first chamber.

14. A hydrophone in accordance with claim 10, comprising:
a ring, made of one of a metal or a plastic material, disposed in first chamber between the at least one flexible wall and rigid plate which limits deformation of the at least one flexible wall towards an inside of first chamber.

15. A hydrophone in accordance with claim 11, comprising:
a ring, made of one of a metal or a plastic material, disposed in first chamber between the at least one flexible wall and rigid plate which limits deformation of the at least one flexible wall towards an inside of first chamber.

16. A hydrophone in accordance with claim 2, wherein the at least one detection unit in second chamber comprises:
a housing including two cups resting against one another, at least one of the two cups being provided with a flexible central part forming a flexible diaphragm, and at least one sensitive element associated with electrodes, which is fastened to the flexible central part of at least one of cups, electrical conductors connected to electrodes of each sensitive element, and a protective sheath for the at least one detection unit and the switch is connected to the at least one electrical.

17. A hydrophone in accordance with claim 3, wherein the at least one detection unit in second chamber comprises:
a housing including two cups resting against one another, at least one of the two cups being provided with a flexible central part forming a flexible diaphragm, and at least one sensitive element associated with electrodes, which is fastened to the flexible central part of at least one of cups, electrical conductors connected to electrodes of each sensitive element, and a protective sheath for the at least one detection unit and the switch is connected to the at least one electrical.

18. A hydrophone in accordance with claim 4, wherein the at least one detection unit in second chamber comprises:
a housing including two cups resting against one another, at least one of the two cups being provided with a flexible central part forming a flexible diaphragm, and at least one sensitive element associated with electrodes, which is fastened to the flexible central part of at least one of cups, electrical conductors connected to electrodes of each sensitive element, and a protective sheath for the at least one detection unit and the switch is connected to the at least one electrical.

19. A hydrophone in accordance with claim 5, wherein the at least one detection unit in second chamber comprises:
a housing including two cups resting against one another, at least one of the two cups being provided with a flexible central part forming a flexible diaphragm, and at least one sensitive element associated with electrodes, which is fastened to the flexible central part of at least one of cups, electrical conductors connected to electrodes of each sensitive element, and a protective sheath for the at least one detection unit and the switch is connected to the at least one electrical.

20. A hydrophone in accordance with claim 6, wherein the at least one detection unit in second chamber comprises:

a housing including two cups resting against one another, at least one of the two cups being provided with a flexible central part forming a flexible diaphragm, and at least one sensitive element associated with electrodes, which is fastened to the flexible central part of at least one of cups, electrical conductors connected to electrodes of each sensitive element, and a protective sheath for the at least one detection unit and the switch is connected to the at least one electrical.

21. A hydrophone in accordance with claim 7, wherein the at least one detection unit in second chamber comprises:

a housing including two cups resting against one another, at least one of the two cups being provided with a flexible central part forming a flexible diaphragm, and at least one sensitive element associated with electrodes, which is fastened to the flexible central part of at least one of cups, electrical conductors connected to electrodes of each sensitive element, and a protective sheath for the at least one detection unit and the switch is connected to the at least one electrical.

22. A hydrophone in accordance with claim 8, wherein the at least one detection unit in second chamber comprises:

a housing including two cups resting against one another, at least one of the two cups being provided with a flexible central part forming a flexible diaphragm, and at least one sensitive element associated with electrodes, which is fastened to the flexible central part of at least one of cups, electrical conductors connected to electrodes of each sensitive element, and a protective sheath for the at least one detection unit and the switch is connected to the at least one electrical.

23. A hydrophone in accordance with claim 9, wherein the at least one detection unit in second chamber comprises:

a housing including two cups resting against one another, at least one of the two cups being provided with a flexible central part forming a flexible diaphragm, and at least one sensitive element associated with electrodes, which is fastened to the flexible central part of at least one of cups, electrical conductors connected to electrodes of each sensitive element, and a protective sheath for the at least one detection unit and the switch is connected to the at least one electrical.

24. A hydrophone in accordance with claim 10, wherein the at least one detection unit in second chamber comprises:

a housing including two cups resting against one another, at least one of the two cups being provided with a flexible central part forming a flexible diaphragm, and at least one sensitive element associated with electrodes, which is fastened to the flexible central part of at least one of cups, electrical conductors connected to electrodes of each sensitive element, and a protective sheath for the at least one detection unit and the switch is connected to the at least one electrical.

25. A hydrophone in accordance with claim 11, wherein the at least one detection unit in second chamber comprises:

a housing including two cups resting against one another, at least one of the two cups being provided with a flexible central part forming a flexible diaphragm, and at least one sensitive element associated with electrodes, which is fastened to the flexible central part of at least one of cups, electrical conductors connected to electrodes of each sensitive element, and a protective sheath for the at least one detection unit and the switch is connected to the at least one electrical.

26. A hydrophone in accordance with claim 12, wherein the at least one detection unit in second chamber comprises:

a housing including two cups resting against one another, at least one of the two cups being provided with a flexible central part forming a flexible diaphragm, and at least one sensitive element associated with electrodes, which is fastened to the flexible central part of at least one of cups, electrical conductors connected to electrodes of each sensitive element, and a protective sheath for the at least one detection unit and the switch is connected to the at least one electrical.

27. A hydrophone in accordance with claim 13, wherein the at least one detection unit in second chamber comprises:

a housing including two cups resting against one another, at least one of the two cups being provided with a flexible central part forming a flexible diaphragm, and at least one sensitive element associated with electrodes, which is fastened to the flexible central part of at least one of cups, electrical conductors connected to electrodes of each sensitive element, and a protective sheath for the at least one detection unit and the switch is connected to the at least one electrical.

28. A hydrophone in accordance with claim 14, wherein the at least one detection unit in second chamber comprises:

a housing including two cups resting against one another, at least one of the two cups being provided with a flexible central part forming a flexible diaphragm, and at least one sensitive element associated with electrodes, which is fastened to the flexible central part of at least one of cups, electrical conductors connected to electrodes of each sensitive element, and a protective sheath for the at least one detection unit and the switch is connected to the at least one electrical.

29. A hydrophone in accordance with claim 15, wherein the at least one detection unit in second chamber comprises:

a housing including two cups resting against one another, at least one of the two cups being provided with a flexible central part forming a flexible diaphragm, and at least one sensitive element associated with electrodes, which is fastened to the flexible central part of at least one of cups, electrical conductors connected to electrodes of each sensitive element, and a protective sheath for the at least one detection unit and the switch is connected to the at least one electrical.

30. A hydrophone in accordance with claim 2, comprising:

a second chamber; and wherein the at least one detection unit is located in the second chamber and comprises a housing including two cups resting against one another, at least one of the two cups being provided with a flexible central part forming a flexible diaphragm, and at least one sensitive element associated with electrodes, which is fastened to the flexible central part of at least one of cups, electrical conductors connected to electrodes of each sensitive element, and a protective sheath for the at least one detection unit and the switch is connected to the at least one electrical.

31. A hydrophone in accordance with claim 30, wherein:

the switch is fastened to an intermediate support between the two cups of the housing.

32. A hydrophone in accordance with claim 30, wherein:
the switch is fastened to an intermediate support between the two cups of housing, the switch being fastened to the intermediate support with a push element of the switch facing the flexible diaphragm of one of the two cups, and an insulating and sealed bushing allowing passage, out of the housing, of an electrical conductor connected to the switch.

33. A hydrophone as claimed in claim 30, wherein:
the switch has flexible blades with a first blade electrically connected to one of the cups and the blades remaining in contact with one another as long as flexion of at least one of the diaphragms, under the action of the outside pressure, remains below a fixed limit.

34. A hydrophone in accordance with claim 2, comprising:
a tubular body including a fixed part containing the at least one detection unit and the switch, and a moving part closed at a first end by the at least one flexible wall, connected to the fixed part by screwing, so that space remaining between the at least one flexible wall and a push element of the switch allows the switch to be always released at a pressure.

35. A method of mounting the hydrophone as claimed in claim 34, comprising:
fitting the moving part of the body onto fixed part by screwing, applying to the at least one flexible wall a predetermined pressure causing the at least one flexible wall to bend towards an inside of the body, and continuing to screw the two parts onto one another until the switch is released.

36. A hydrophone in accordance with claim 1, wherein:
the switch is normally open.

37. A hydrophone in accordance with claim 1, wherein:
the switch is normally closed.

* * * * *